United States Patent
Patil et al.

(10) Patent No.: US 10,519,920 B2
(45) Date of Patent: Dec. 31, 2019

(54) AUTOMATIC TWO-MODE HIGH REDUCTION POWER TRANSMISSION SYSTEM

(71) Applicant: Deere & Company, Moline, IL (US)

(72) Inventors: Mahendra S. Patil, Pune (IN); Christopher D. Turner, Waterloo, IA (US); Prasad M. Panse, Pune (IN); Pranav Jagtap, Pune (IN)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/873,622

(22) Filed: Jan. 17, 2018

(65) Prior Publication Data

US 2019/0219022 A1   Jul. 18, 2019

(51) Int. Cl.
*F02N 15/04*   (2006.01)
*B60L 50/16*   (2019.01)
(Continued)

(52) U.S. Cl.
CPC ............ *F02N 15/046* (2013.01); *B60L 50/16* (2019.02); *F02N 11/04* (2013.01); *F16D 41/07* (2013.01);
(Continued)

(58) Field of Classification Search
CPC ........ F02N 15/046; F02N 11/04; B60L 11/14; F16D 41/07; F16H 3/56; F16H 55/36; F16H 61/421
See application file for complete search history.

(56) References Cited

U.S. PATENT DOCUMENTS

| | | |
|---|---|---|
| 3,062,073 A | 11/1962 | Brass |
| 3,150,544 A | 9/1964 | Brass |

(Continued)

FOREIGN PATENT DOCUMENTS

| | | |
|---|---|---|
| DE | 19927521 A1 | 6/2000 |
| DE | 19911924 A1 | 9/2000 |

(Continued)

OTHER PUBLICATIONS

Ioan-Adrian Viorel et al., Integrated Starter-Generators for Automotive Applications, Technical University of Cluj-Romania, Department of Electrical Machines, vol. 45, No. 3, 2004, (6 pages).

(Continued)

*Primary Examiner* — Mark J Beauchaine
(74) *Attorney, Agent, or Firm* — Klintworth & Rozenblat IP LLP

(57) ABSTRACT

An automatic two-mode high reduction power transmission system. A power transmission system includes a first device that delivers a first input and receives a second output. A second device delivers a second input and receives a first output. A power transmission has two planetary gear sets and operates in a first mode at a first speed ratio, where the first input is received from the first device and in response, the first output is delivered to the second device. The power transmission operates in a second mode at a second speed ratio that is different than the first speed ratio, where the second input is received from the second device and in response, the second output is delivered to the first device. A pair of freewheel mechanisms automatically couple one of the first or second devices with the power transmission to provide the two modes.

20 Claims, 4 Drawing Sheets

(51) Int. Cl.
*F02N 11/04* (2006.01)
*F16D 41/07* (2006.01)
*F16H 3/56* (2006.01)
*F16H 55/36* (2006.01)
*F16H 61/421* (2010.01)

(52) U.S. Cl.
CPC .............. *F16H 3/56* (2013.01); *F16H 55/36* (2013.01); *F16H 61/421* (2013.01); *B60L 2210/44* (2013.01); *B60L 2240/12* (2013.01); *B60L 2240/441* (2013.01); *F16H 2200/2007* (2013.01); *F16H 2200/2084* (2013.01)

(56) References Cited

U.S. PATENT DOCUMENTS

| | | | |
|---|---|---|---|
| 4,862,009 | A | 8/1989 | King |
| 4,926,713 | A | 5/1990 | Madill |
| 5,033,994 | A | 7/1991 | Wu |
| 5,856,709 | A | 1/1999 | Ibaraki |
| 6,409,622 | B1 * | 6/2002 | Bolz ........................ F02N 11/04 475/290 |
| 6,484,596 | B2 | 11/2002 | Puchas |
| 6,832,970 | B2 | 12/2004 | Eibler |
| 7,503,871 | B2 | 3/2009 | Kozarekar et al. |
| 7,780,562 | B2 | 8/2010 | King et al. |
| 8,226,517 | B2 | 7/2012 | Tsai |
| 8,235,859 | B2 | 8/2012 | Yun |
| 8,734,281 | B2 * | 5/2014 | Ai ........................ B60K 6/445 180/65.21 |
| 9,145,136 | B2 | 9/2015 | Suntharalingam |
| 9,261,064 | B2 | 2/2016 | Patel |
| 9,371,810 | B2 | 6/2016 | Creviston |
| 9,421,855 | B2 | 8/2016 | Suntharalingam |
| 9,541,172 | B1 | 1/2017 | Wright |
| 2002/0033059 | A1 | 3/2002 | Pels et al. |
| 2002/0177504 | A1 | 11/2002 | Pels et al. |
| 2003/0001391 | A1 | 1/2003 | Kuang |
| 2003/0104900 | A1 * | 6/2003 | Takahashi ................ F02N 11/04 477/3 |
| 2003/0224888 | A1 | 12/2003 | Wilder |
| 2004/0116226 | A1 | 6/2004 | Baker et al. |
| 2007/0157899 | A1 | 7/2007 | Seufert |
| 2007/0265126 | A1 | 11/2007 | Janson |
| 2008/0179119 | A1 | 7/2008 | Grenn et al. |
| 2009/0055061 | A1 | 2/2009 | Zhu |
| 2010/0029428 | A1 | 2/2010 | Abe |
| 2010/0063704 | A1 | 3/2010 | Okubo |
| 2010/0076634 | A1 | 3/2010 | Brigham |
| 2011/0010031 | A1 | 1/2011 | Syed et al. |
| 2011/0053729 | A1 | 3/2011 | Parsons et al. |
| 2011/0070999 | A1 | 3/2011 | Soliman et al. |
| 2011/0263379 | A1 | 10/2011 | Liang et al. |
| 2012/0103293 | A1 * | 5/2012 | Robinette ............ F02N 11/0851 123/179.25 |
| 2012/0235473 | A1 | 9/2012 | Jiang |
| 2012/0240723 | A1 | 9/2012 | Gluckler et al. |
| 2013/0046427 | A1 | 2/2013 | Hohenberg |
| 2013/0252773 | A1 | 9/2013 | Suntharalingam |
| 2013/0316873 | A1 | 11/2013 | Jansen et al. |
| 2014/0137824 | A1 | 5/2014 | Jacques et al. |
| 2014/0150604 | A1 | 6/2014 | Kaltenbach |
| 2014/0256490 | A1 * | 9/2014 | Honda ...................... B60K 6/52 475/5 |
| 2015/0239335 | A1 | 8/2015 | Wachter |
| 2016/0031438 | A1 | 2/2016 | Matsui |
| 2016/0052382 | A1 | 2/2016 | Clark et al. |
| 2016/0076629 | A1 | 3/2016 | Modrzejewski et al. |
| 2016/0082821 | A1 | 3/2016 | Mueller et al. |
| 2016/0137045 | A1 | 5/2016 | Zhu et al. |
| 2016/0288780 | A1 | 10/2016 | Shukla |
| 2017/0248196 | A1 | 8/2017 | Turner et al. |
| 2018/0100564 | A1 | 4/2018 | Fliearman et al. |
| 2018/0106365 | A1 | 4/2018 | Tsukizaki et al. |
| 2018/0186230 | A1 | 7/2018 | Fukuda et al. |
| 2018/0236864 | A1 | 8/2018 | Imamura et al. |
| 2019/0160936 | A1 | 5/2019 | Lubben |

FOREIGN PATENT DOCUMENTS

| | | |
|---|---|---|
| DE | 19923316 A1 | 11/2000 |
| DE | 102008045202 A2 | 1/2001 |
| DE | 102006037576 A1 | 4/2008 |
| DE | 102010030570 A1 | 12/2011 |
| DE | 102010030571 A1 | 12/2011 |
| DE | 102010060140 A1 | 4/2012 |
| DE | 102011080068 A1 | 1/2013 |
| DE | 102011089708 A1 | 6/2013 |
| DE | 102011089709 A1 | 6/2013 |
| DE | 102011089710 A1 | 6/2013 |
| DE | 112011103973 T5 | 10/2013 |
| DE | 102013203009 A1 | 8/2014 |
| DE | 102013206970 A1 | 10/2014 |
| DE | 102014200720 B3 | 2/2015 |
| DE | 102014200723 B3 | 2/2015 |
| DE | 102017203026 A1 | 8/2017 |
| DE | 102017204269 A1 | 9/2017 |
| EP | 1069310 A2 | 1/2001 |
| EP | 2272702 A2 | 1/2011 |
| JP | 2015116004 A | 6/2015 |
| WO | 200700107458 A2 | 9/2007 |

OTHER PUBLICATIONS

German Search Report for application No. 102018221495.6 dated May 28, 2019. (US related matters 230.0436 and 0325) (10 pages).

Deere & Company, Bi-Directional Integrated Starter-Generator Device, Utility U.S. Appl. No. 16/385,784, filed Apr. 16, 2019.

Deere & Company, Multi-Mode Integrated Starter-Generator Device, Utility U.S. Appl. No. 16/385,860, filed Apr. 16, 2019.

Deere & Company, Multi-Mode Integrated Starter-Generator Device With Preloaded Clutch, Utility U.S. Appl. No. 16/385,892, filed Apr. 16, 2019.

Deere & Company, Multi-Mode Integrated Starter-Generator Device With Magnetic Cam Assembly, Utility U.S. Appl. No. 16/385,934, filed Apr. 16, 2019.

Deere & Company, Multi-Mode Integrated Starter-Generator Device With Cam Arrangement, Utility U.S. Appl. No. 16/385,964, filed Apr. 16, 2019.

Deere & Company, Multi-Mode Integrated Starter-Generator Device With Dog Clutch Arrangement, Utility U.S. Appl. No. 16/385,989, filed Apr. 16, 2019.

Deere & Company, Multi-Mode Starter-Generator Device Transmission With Single Valve Control, Utility U.S. Appl. No. 16/386,001, filed Apr. 16, 2019.

Deere & Company, Multi-Mode Integrated Starter-Generator Device With Electromagnetic Actuation Assembly, Utility U.S. Appl. No. 16/386,020, filed Apr. 16, 2019.

Deere & Company, Multi-Mode Integrated Starter-Generator Device With Transmission Assembly Mounting Arrangement, Utility U.S. Appl. No. 16/386,052, filed Apr. 16, 2019.

Deere & Company, Multi-Mode Integrated Starter-Generator Device With Solenoid Cam Actuation Apparatus, Utility U.S. Appl. No. 16/386,075, filed Apr. 16, 2019.

Harmonic Drive LLC, Harmonic Planetary Precision Gearing & Motion Control, Product Brochure, Mar. 2006. (24 pages).

NTN Automotive Sales Headquarters, Compact Clutch Integrated Pulley for Alternators, NTN Technical Review No. 75, 2007. (3 pages).

North Atalantic Starter, Starter Drives Explained, Northatlan.com, 2005. (1 page).

USPTO Non-Final Office Action dated Nov. 2, 2017 for Utility U.S. Appl. No. 15/056,767.

USPTO Non-Final Office Action dated Sep. 28, 2018 for Utility U.S. Appl. No. 15/056,767 (23 pages).

USPTO Non-Final Office Action dated Feb. 25, 2019 for Utility U.S. Appl. No 15/834,356 (50 pages).

(56) References Cited

OTHER PUBLICATIONS

USPTO Non-Final Office Action dated Nov. 1, 2018 for Utility U.S. Appl. No. 15/825,520 (21 pages).
USPTO Final Office Action dated Jun. 11, 2018 for Utility U.S. Appl. No. 15/056,767 (15 pages).
USPTO Final Office Action dated Mar. 8, 2019 for Utility U.S. Appl. No. 15/056,767 (23 pages).
German Search Report for application No. 1020172030267 dated Aug. 4, 2017 (10 pages).
German Search Report for application No. 1020182189080 dated May 27, 2019 (10 pages).
German Search Report for application No. 1020182180784 dated Jun. 4, 2019 (12 pages).

* cited by examiner

AUTOMATIC TWO-MODE HIGH REDUCTION POWER TRANSMISSION SYSTEM

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to power transmission systems, and to gearing arrangements for power transfer applications with two-way power flow and high reduction capability.

BACKGROUND OF THE DISCLOSURE

Work vehicles, such as those used in the agriculture, construction and forestry industries, and other vehicles, equipment and machinery, may be driven by a power plant which includes an internal combustion engine or alternative power source. Engines require mechanical input from a starter to initiate rotation of a crankshaft, and thereby reciprocation of the pistons within the cylinders to initiate ignition. A typical starter includes a motor with a solenoid that selectively engages output from the motor with the engine for starting purposes. Once the engine is running, the starter motor is disengaged from the engine and is no longer used. Engine powered applications also typically include an alternator that is driven by a running engine and that converts mechanical energy to electrical energy in the form of alternating current. The alternator is typically driven by a belt that takes power from the engine.

SUMMARY OF THE DISCLOSURE

The disclosure provides an automatic two-mode, high reduction, power transmission system. In one aspect, a power transmission system includes a first device that delivers a first input and receives a second output. A second device delivers a second input and receives a first output. A power transmission has two planetary gear sets and operates in a first mode at a first speed ratio, where the first input is received from the first device and in response, the first output is delivered to the second device. The power transmission operates in a second mode at a second speed ratio that is different than the first speed ratio, where the second input is received from the second device and in response, the second output is delivered to the first device. A pair of freewheel mechanisms automatically couple one of the first or second devices with the power transmission to provide the two modes.

In another aspect, a power transmission system includes a first device that delivers a first input and receives a second output. A second device delivers a second input and receives a first output. One planetary gear set is directly connected to the first device. Another planetary gear set is connected with the second device. A freewheel mechanism is connected between the second device and at least one of the first planetary gear set or the second planetary gear set, and another freewheel device is connected between the second device and the second planetary gear set. The power transmission system operates in a first mode at a first speed ratio, where the first device delivers a first input through a first power flow that results in a first output supplied to the second device. The first power flow is directed through the first planetary gear set, the second planetary gear set, and one of the freewheel mechanisms. The power transmission operates in a second mode at a second speed ratio different than the first speed ratio, where the second device delivers a second input through a second power flow that results in a second output supplied to the first device. The second power flow is directed through the other freewheel mechanism, the first planetary gear set and the second planetary gear set.

In an additional aspect, a power transmission system includes a first device that delivers a first input and receives a second output. A second device delivers a second input and receives a first output. A sun gear is directly connected with the first device. A set of first planet gears mesh with the sun gear. The power transmission system includes a set of second planet gears, each one of which is connected to one planet gear in the first set of planet gears. A carrier carries both the first and second sets of planet gears. A first ring gear meshes with the first set of planet gears. A second ring gear meshes with the second set of planet gears. A first freewheel mechanism is connected between the second device and the carrier. A second freewheel mechanism is connected between the second device and the second ring gear. The power transmission system operates in a first mode at a first speed ratio, where the first device delivers a first input through a first power flow that results in a first output supplied to the second device. The first power flow is directed through, in order, the sun gear, the first set of planet gears, the second set of planet gears, the carrier, and the second freewheel mechanism. The power transmission system operates in a second mode at a second speed ratio that is different than the first speed ratio, where the second device delivers a second input through a second power flow that results in a second output supplied to the first device. The second power flow is directed through, in order, the first freewheel mechanism, the carrier, the first set of planet gears, and the sun gear.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
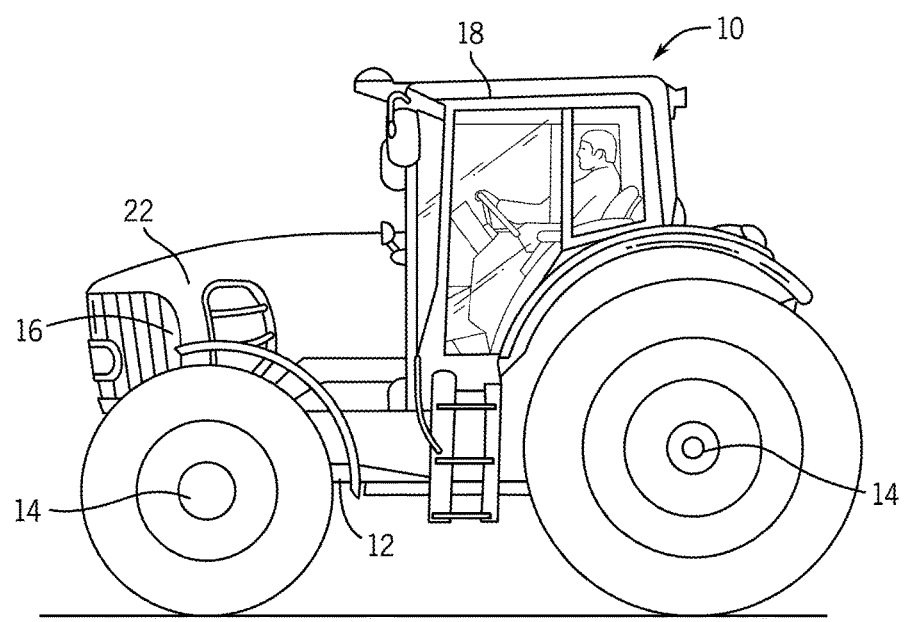
FIG. 1 is a side view of an example work vehicle in the form of an agricultural tractor in which the disclosed automatic two-mode high reduction power transmission system may be used.

The following describes one or more example embodiments of a disclosed automatic two-mode high reduction power transmission system, as shown in the accompanying figures of the drawings described briefly above. Various modifications to the example embodiments may be contemplated by one of skill in the art.

In one or more example implementations of the disclosed multi-speed high reduction power transmission system, bi-directional power transmission is provided at two different speed ratios, one of which involves a high-speed reduction with high torque capability. Generally, power is transferred in two different modes to serve two separate functions. However, in other embodiments additional modes may be contemplated. Power flow in one mode of operation is directed from an input shaft to an output shaft, each of which serves the opposite role in the other mode of operation. Switching between modes occurs automatically through the use of two freewheel mechanisms that operate mechanically, without the need for external control mechanisms.

The following description relates to power transmission in the context of certain work vehicle engine related applications for purposes of demonstrating examples. With an internal combustion engine, a starting function is needed to initiate operation, while a power supply function is intermittently, or continuously needed during engine operation. Since the starting and power supply functions are needed at different times, and since both may involve the use of an electric machine, the disclosed system economically provides both functions through the use of one machine. The present disclosure is not limited to vehicle applications, or to those that involve engine starting but rather, also encompasses any application where multi-mode high reduction power transmission is needed. Accordingly, the teachings of the present disclosure may be applied to power transmission systems in a variety of applications, including with vehicle engines, when desired.

In an example of the present disclosure as further described below, a power transmission system includes a first device that delivers a first input and receives a second output. A second device delivers a second input and receives a first output. A power transmission has two planetary gear sets and operates in a first mode at a first speed ratio, where the first input is received from the first device and in response, the first output is delivered to the second device. The power transmission operates in a second mode at a second speed ratio that is different than the first speed ratio, where the second input is received from the second device and in response, the second output is delivered to the first device. A pair of freewheel mechanisms automatically couple/decouple one of the first or second devices with the power transmission to provide the two modes.

In one example, the first device is an electrical machine that operates as a starter motor and as a generator. In this example, the second device is an engine that is started by the first device in the starter mode and then drives the first device in the generator mode.

As noted above, the automatic two-mode high reduction power transmission system as described herein may be employed in a variety of applications. Referring to FIG. 1, one example involves a power transmission system that may be included in a work vehicle 10, which in this example is depicted as an agricultural tractor. It will be understood, however, that other configurations are contemplated, including configurations with work vehicle 10 as a different kind of tractor, or as a work vehicle used for other aspects of the agriculture industry or for the construction or forestry industries (e.g., a harvester, a log skidder, motor grader, and so on). It will further be understood that the disclosed two-mode high reduction power transmission system may also be used in non-work vehicles, non-vehicle applications (e.g. stationary installations), and with other types of equipment and machines where automatic multi-mode power transmission is useful.

In the current example, the work vehicle 10 has a main frame or chassis 12 supported by wheels 14 that engage the ground. Two or four of the wheels 14 may be powered for propelling the work vehicle 10 and at least the front wheels 14 are steerable to control the direction of travel. The chassis 12 supports device that serves as a power plant in the form of an internal combustion engine, in this example, referred to as an engine device 16. A powertrain transmission (not shown), connects the engine device 16 with the wheels 14 to provide different speed ratios for varying operating conditions. An operator cabin 18 is provided in which operator interface and control means (e.g., various controls wheels, levers, switches, buttons, screens, keyboards, etc.), are stationed. The work vehicle 10 may be configured to use and/or to provide to other connected equipment, power from the engine device 16 to generate electric power or to drive mechanical, fluid powered, or other functions.

Figure 2:
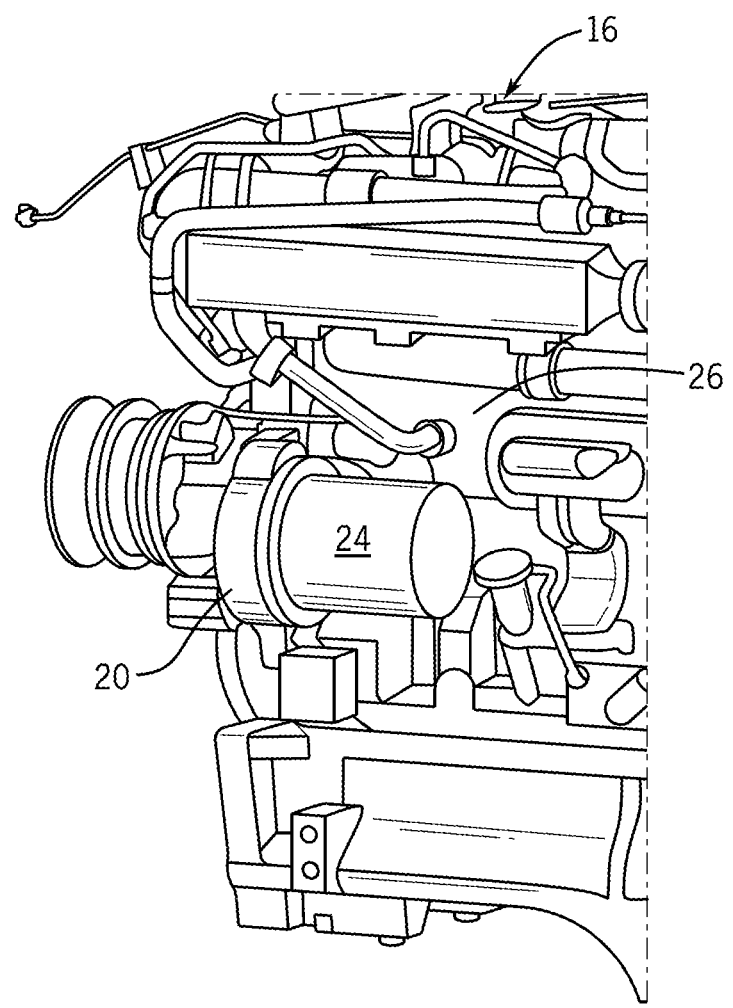
FIG. 2 is a simplified partial isometric view of an engine of the work vehicle of FIG. 1 showing an example automatic two-mode high reduction power transmission system used with a starter-generator device.

To deliver to, and extract power from, the engine device 16, a power transmission 20 is mounted within an engine compartment 22 of the work vehicle 10 and in this example, is connected with a device configured as an electrical machine in the form of a starter-generator device 24. The power transmission 20 and the starter-generator device 24 preferably mount directly and compactly to the engine device 16, for example, as shown in FIG. 2, so as not to project significantly from the engine device 16 (and thereby to avoid enlarging the engine compartment space envelope). In some examples, the power transmission 20 and the starter-generator device 24 are configured to drop in place of a conventional starter device. Notably, the starter-generator device 24 may be mounted at the side 26 of the engine device 16 at a location where the serpentine (or other) drive belt is not needed. Removing the starter-generator from the belt pathway reduces the complexity of the engine device 16 layout and allows for more compact packaging. The starter-generator device 24 may generally be mounted on or near the engine device 16 in a location suitable for coupling to the engine device 16, such as at a flywheel, or other element that links with the crankshaft as further described below. With a connection to the crankshaft provided, the power transmission 20 is adapted for use to both accept power from the engine device 16, and also to deliver power to crank the engine device 16 for starting purposes. As such, the power transmission 20 operates in at least two modes, in this example, one mode where the starter-generator device 24 operates in a starting mode and another mode where the starter-generator device 24 operates in a power generation mode.

Figure 3:
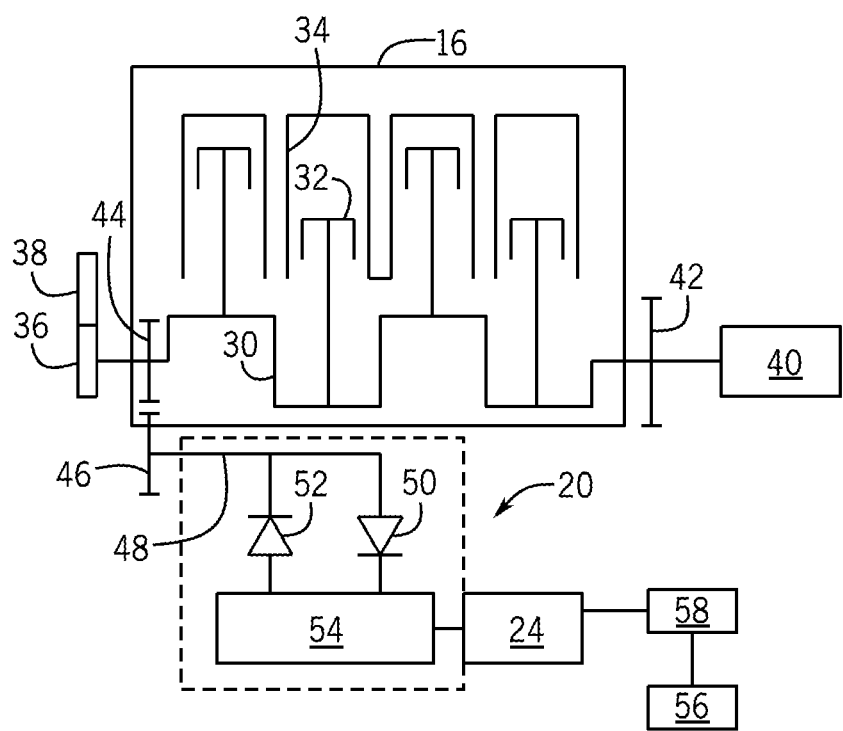
FIG. 3 is a block diagram of a portion of a powertrain of the work vehicle of FIG. 1 having an example automatic two-mode high reduction power transmission system according to this disclosure.

To provide two-mode functioning, the power transmission 20 may be connected in a power transmission system 28 as schematically shown in FIG. 3. In this example, the engine device 16 includes a crankshaft 30 connected with a number of pistons 32 disposed to reciprocate in respective combustion chambers 34. The crankshaft 30 may be connected with a power take-off such as a pulley 36 that may be connected with a serpentine belt 38 for driving various accessories (not shown), in a conventional manner. The opposite end of the crankshaft 30 may be connected with a powertrain transmission 40 for providing multiple speed ratios in propelling the work vehicle 10, and may include a flywheel 42. In this example, an additional connection with the crankshaft 30 is provided, such as at a gear 44 disposed internal to the engine device 16 for coupling with the power transmission 20. In other embodiments, the power transmission 20 may be coupled with the crankshaft 30 at other locations such as at the pulley 36, the flywheel 42 or at another location of the driveline of the work vehicle 10.

The gear 44 meshes with a gear 46 that is connected with a shaft 48. The shaft 48 extends to the power transmission 20 and specifically to a pair of freewheel mechanisms 50, 52. The freewheel mechanisms 50, 52 are two-state devices that provide coupling or decoupling. Examples include roller & ramp type one-way clutches, sprag type one-way clutches, mechanical diode type mechanisms, ratchet type one-way clutches, or other mechanisms that provide freewheeling and engagement. The freewheel mechanisms 50, 52 may be located inside the power transmission 20 as in the current example, or at a location outside the power transmission 20. The power transmission 20 includes a gearing arrangement 54 configured to provide two-mode high reduction power transfer between the engine device 16 and the starter-generator device 24. One mode involves operation of the starter-generator device 24 in a motor mode to start the engine device 16. Another mode involves operating the starter-generator device 24 in a generator mode to generate power. The starter-generator device 24 is coupled with one of more energy storage devices such as a battery 56 that uses direct current (DC), through an inverter/rectifier 58. In this example, the starter-generator device is an alternator that is an alternating current (AC) power generator. The inverter/rectifier 58 inverts DC power from the battery 56 into AC power during cranking of the engine device 16 by the starter-generator device 24. In addition, the inverter/rectifier 58 rectifies AC power to DC power when the engine device 16 drives the starter-generator device 24 to generate power for storage in the battery 56 and/or for other uses. The inverter/rectifier 58 may be a separate component as shown, or may be incorporated into the starter-generator device 24. In other embodiments, the starter-generator device 24 and the engine device 16 may be replaced with other devices that function in multiple modes through operation of the power transmission 20.

Figure 4:
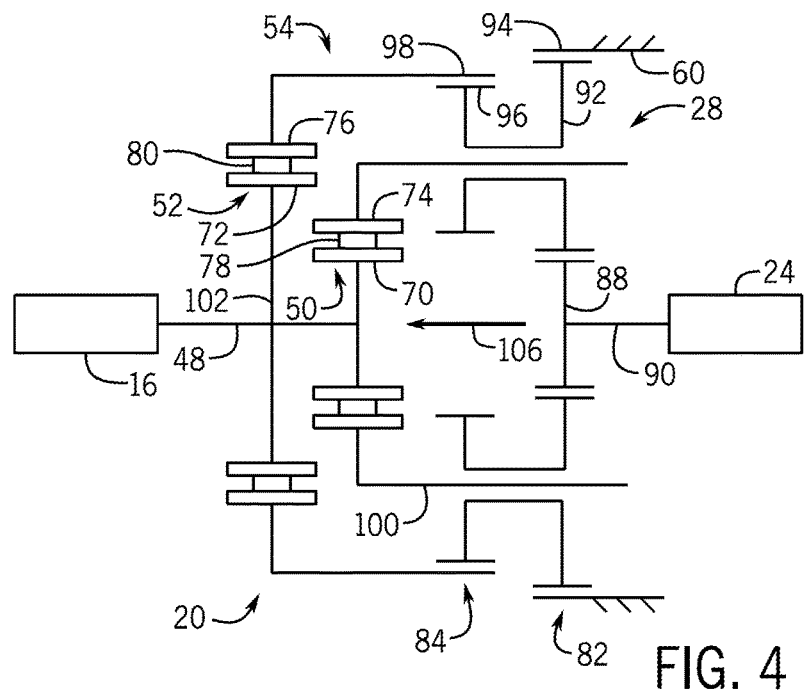
FIG. 4 is a schematic diagram of a portion of a powertrain of the work vehicle of FIG. 1 having an example automatic two-mode high reduction power transmission system, shown in a first mode.
Figure 5:
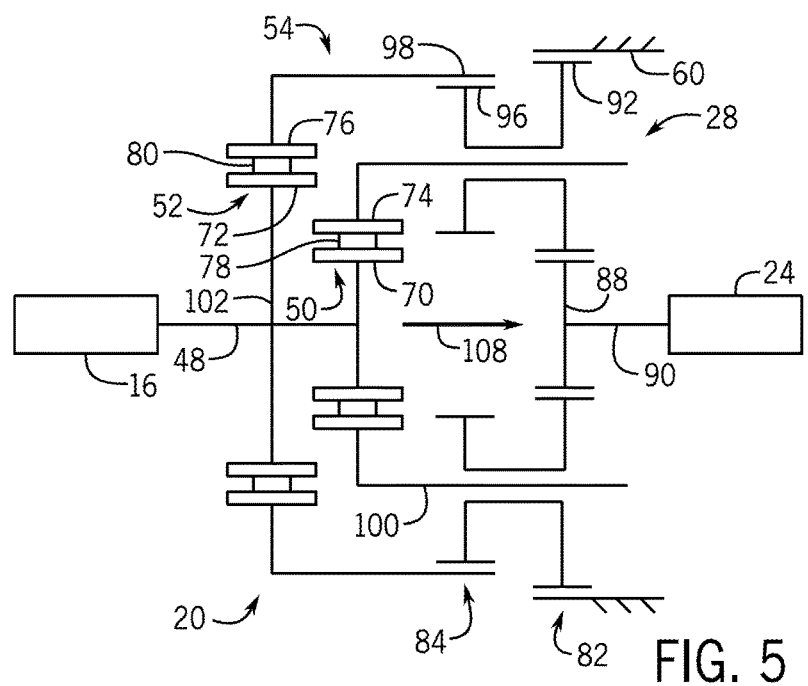
FIG. 5 is a schematic diagram of a portion of a powertrain of the work vehicle of FIG. 1 having an example automatic two-mode high reduction power transmission system, shown in a second mode.

Referring to FIGS. 4 and 5, the power transmission system 28 is illustrated in two modes, a first mode of FIG. 4 where the starter-generator device 24 operates in a motor mode to start the engine device 16 and a second mode of FIG. 5 where the starter-generator device 24 operates in the generator mode and is driven by the engine device 16. In this example, the power transmission system 28 includes a power transmission 20 linking a pair of input/output devices in the form of the starter-generator device 24 and the engine device 16. The starter-generator device 24 and the engine device 16 each act to provide both input and output functions depending on the mode of the power transmission system 28. The gearing arrangement 54 and the freewheel mechanisms 50, 52 may be assembled as a unit in a case 60, or as separate interconnected parts, and provide a linkage between the starter-generator device 24 and the engine device 16. The freewheel mechanisms 50, 52, in this example include respective inner components 70, 72 and outer components 74, 76. The inner components 70, 72 and the outer components 74, 76 are rotatable, and include respective locking elements 78, 80 operable to lock/unlock the inner component 72 with the outer component 76 (in the case of locking elements 78), or the inner component 72 with the outer component 76 (in the case of locking elements 80). More specifically, and as an example, in the freewheel mechanism 50 the outer component 74 may be driven by the starter-generator device 24 for starting the engine device 16. The locking elements 78 function to lock the outer component 74 with the inner component 70 as the outer component 74 is driven to rotate. As the engine device 16 starts and begins to operate, when the inner component 70 begins to rotate faster than the outer component 74, the locking elements 78 unlock and the inner component 70 freewheels/overruns relative to the outer component 74 in the same direction of rotation. Accordingly, the switch between torque delivery and freewheel occurs automatically, without external control.

To supply adequate torque from the starter-generator device 24 to the outer component 74 for starting of the engine device 16, the gearing arrangement 54 includes a pair of planetary gear sets 82, 84 that effect a high reduction ratio approaching 100:1 speed reduction. The planetary gear sets 82, 84 are contained in the case 60. The planetary gear set 82 includes a sun gear 88 that is directly connected with the starter-generator device 24 through a shaft 90. A set of planet gears 92 mesh with, and orbit, the sun gear 88. The planet gears 92 also mesh with a ring gear 94, which is grounded/non-rotating and may be fixed to, or formed as part of, the case 60. The other planetary gear set 84, does not include a sun gear but has a set of planet gears 96 that mesh with a ring gear 98. Each of the planet gears 96 is aligned with, and connected to, a respective one of the planet gears 92 so that, in effect, the planet gears 96 also orbit the sun gear 88. The planet gears 92, 96 may be constructed in the form of composite planet gears, each with a pair of pinions that are paired together as rigidly connected gears that are longitudinally arranged to rotate together about a common axis, and may have different radii and/or different numbers of teeth. In this example, each aligned pair of planet gears 92, 96 is carried on a common carrier 100 and the planet gears 92 are larger/have a greater number of teeth than the planet gears 96.

The ring gear 98 is connected with the outer component 76 of the freewheel mechanism 52 and the carrier 100 is connected with the outer component 74 of the freewheel mechanism 50. Each of the inner components 70, 72 of the freewheel mechanisms 50, 52 respectively, is connected with the engine device 16. The inner component 72 is connected with the engine device 16 through a torque transfer element 102 and the shaft 48. The shaft 48, the torque transfer element 102 and the inner component 72 may be connected or formed as one piece and in some embodiments, may take the form of a single part such as a shaft. The inner component 70 is connected with the engine device 16 through a torque transfer element 104 and the shaft 48. The shaft 48, the torque transfer element 104, and the inner component 70 may be connected or formed as one piece and in some embodiments, may take the form of a single part such as a shaft.

For starting of the engine device 16, the freewheel mechanism 50 is disengaged/freewheeling and the freewheel mechanism 52 is engaged and transferring torque with the locking elements 80 locked between the inner and outer components 72, 76. As shown in FIG. 4, this provides a power flow 106 from the starter-generator device 24 to the engine device 16 that passes through, in order, the shaft 90, the sun gear 88, the planet gears 92, the planet gears 96, the ring gear 98, the freewheel mechanism 52, the torque transfer element 102 and the shaft 48. In this example, the sun gear 88 is smaller than the planet gears 92 providing a first stage reduction. The planet gears 96 are smaller than the planet gears 92, which provides a second stage reduction. The planet gears 96 are smaller than the ring gear 98, which provides a third stage reduction. In some embodiments the overall reduction from the sun gear 88 to the shaft 48 approaches 100:1, providing high torque for starting the engine device 16.

For driving the starter-generator device 24 by operation of the engine device 16, the freewheel mechanism 52 is disengaged/freewheeling and the freewheel mechanism 50 is engaged and transferring torque with the locking elements 78 locked between the inner and outer components 70, 74. As shown in FIG. 5, this provides a power flow 108 from the engine device 16 to the starter-generator device 24 that passes through, in order, the shaft 48, the torque transfer element 104, the freewheel mechanism 50, the carrier 100, the planet gears 92, the sun gear 88, and the shaft 90. The ratio from the engine device 16 to the sun gear 88 may be in the range of 3:1-4:1 or may be at par, or a speed increase may be provided in some embodiments.

Through the examples described above, an automatic high reduction power transmission system provides one mode of operation with high speed reduction for high torque output and another mode of operation with low speed reduction or a speed increase for high speed output. Switching between the two modes is effected automatically in response to the relative speeds between input and output through the use of two mechanical freewheel devices.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A power transmission system comprising:
   a first device configured to deliver a first input and to receive a second output;
   a second device configured to deliver a second input and to receive a first output;
   a power transmission having first and second planetary gear sets and configured to:
   operate in a first mode having a first speed ratio, wherein the first input is received from the first device and, in response, the first output is delivered to the second device; and
   operate in a second mode having a second speed ratio different than the first speed ratio, wherein the second input is received from the second device and, in response, the second output is delivered to the first device; and
   first and second freewheel mechanisms each configured to automatically couple one of the first or second devices with the power transmission.

2. The system of claim 1, wherein the first device and the power transmission are configured as a unit that mounts on the second device.

3. The system of claim 2, wherein the first device comprises an electrical machine configured to operate in a motor mode and in a generator mode, and wherein the second device comprises an internal combustion engine.

4. The system of claim 1, comprising:
   a sun gear disposed in the first planetary gear set and coupled directly with the first device; and
   a ring gear disposed in the second planetary gear set and couplable with the second device through one of the first or second freewheel mechanisms.

5. The system of claim 1, comprising:
   a sun gear disposed in the first planetary gear set and coupled directly with the first device;
   a first ring gear;
   a first set of planet gears that mesh with the sun gear and with the first ring gear;
   a second ring gear; and
   a second set of planet gears that mesh with the second ring gear;
   wherein the first and second sets of planet gears are configured as stepped pinion gears where each stepped pinion gear has a first pinion meshing with the first ring gear and a second pinion meshing with the second ring gear, the first pinion fixed with the second pinion, and the first pinion larger in size than the second pinion.

6. The system of claim 5, comprising: a carrier carrying the stepped pinion gears, wherein the first freewheel mechanism is configured to control coupling between the second device and the carrier and the second freewheel mechanism is configured to control coupling between the second device and the second ring gear.

7. The system of claim 6, wherein the first input device is connected, directly, to the sun gear.

8. The system of claim 7, wherein the second planetary gear set does not include a sun gear.

9. The system of claim 8, wherein the first device comprises an electrical machine configured to operate in a motor mode, and in a generator mode and wherein the second device comprises an internal combustion engine.

10. The system of claim 9, wherein the electrical machine is configured to start the engine when operating in the motor mode by supplying the first input to the power transmission, wherein the first freewheel mechanism is disengaged to freewheel without transmitting torque, and the second freewheel mechanism is engaged to transmit torque from the second ring gear to the engine.

11. The system of claim 10, wherein the electrical machine is configured to generate electric power when operating in the generator mode while the engine supplies the second input to the power transmission wherein the first freewheel mechanism is engaged and transmitting torque from the engine to the carrier, and the second freewheel mechanism is disengaged to freewheel without transmitting torque.

12. A power transmission system comprising:
a first device configured to deliver a first input and to receive a second output;
a second device configured to deliver a second input and to receive a first output;
a first planetary gear set connected, directly, to the first device;
a second planetary gear set connected with the second device;
a first freewheel mechanism connected between the second device and at least one of the first planetary gear set or the second planetary gear set; and
a second freewheel device connected between the second device and the second planetary gear set;
wherein the power transmission system is configured to:
operate in a first mode having a first speed ratio, wherein the first device delivers a first input through a first power flow that results in a first output supplied to the second device, the first power flow directed through the first planetary gear set, the second planetary gear set, and the second freewheel mechanism; and
operate in a second mode having a second speed ratio different than the first speed ratio, wherein the second device delivers a second input through a second power flow that results in a second output supplied to the first device, the second power flow directed through the first freewheel mechanism, the first planetary gear set and the second planetary gear set.

13. The system of claim 12, comprising:
a sun gear disposed in the first planetary gear set and coupled directly with the first device; and
a ring gear disposed in the second planetary gear set and couplable with the second device through the second freewheel mechanism.

14. The system of claim 12, comprising:
a sun gear disposed in the first planetary gear set and coupled directly with the first device;
a first ring gear in the first planetary gear set;
a first set of planet gears that mesh with the sun gear and with the first ring gear;
a ring gear disposed in the second planetary gear set and couplable with the second device through the second freewheel mechanism;
a second ring gear in the second planetary gear set; and
a second set of planet gears that mesh with the second ring gear;
wherein the first and second sets of planet gears are configured as stepped pinion gears where each stepped pinion gear has a first pinion meshing with the first ring gear and a second pinion meshing with the second ring gear, the first pinion fixed with the second pinion, and the first pinion larger in size than the second pinion.

15. The system of claim 14, comprising: a carrier carrying the stepped pinion gears, wherein the first freewheel mechanism is configured to control coupling between the second device and the carrier and the second freewheel mechanism is configured to control coupling between the second device and the second ring gear.

16. The system of claim 15, wherein the second planetary gear set does not include a sun gear.

17. The system of claim 16, wherein the first device comprises an electrical machine configured to operate in a motor mode and in a generator mode and wherein the second device comprises an internal combustion engine.

18. The system of claim 17, wherein the electrical machine is configured to start the engine when operating in the motor mode to supply the first input to the power transmission wherein the first freewheel mechanism is disengaged to freewheel without transmitting torque, and the second freewheel mechanism is engaged and transmitting torque from the second ring gear to the engine.

19. The system of claim 18, wherein the electrical machine is configured to generate electric power when operating in the generator mode while the engine supplies the second input to the power transmission wherein the first freewheel mechanism is engaged and transmitting torque from the engine to the carrier, and the second freewheel mechanism is disengaged to freewheel without transmitting torque.

20. A power transmission system comprising:
a first device configured to deliver a first input and to receive a second output;
a second device configured to deliver a second input and to receive a first output;
a sun gear connected, directly, with the first device;
a set of first planet gears meshing with the sun gear;
a set of second planet gears each one of which is connected to one planet gear in the first set of planet gears;
a carrier carrying both the first and second sets of planet gears;
a first ring gear meshing with the first set of planet gears;
a second ring gear meshing with the second set of planet gears;
a first freewheel mechanism connected between the second device and the carrier; and
a second freewheel mechanism connected between the second device and the second ring gear;
wherein the power transmission system is configured to:
operate in a first mode having a first speed ratio, wherein the first device delivers a first input through a first power flow that results in a first output supplied to the second device, the first power flow directed through, in order, the sun gear, the first set of planet gears, the second set of planet gears, the carrier, and the second freewheel mechanism; and
operate in a second mode having a second speed ratio different than the first speed ratio, wherein the second device delivers a second input through a second power flow that results in a second output supplied to the first device, the second powerflow directed through, in order, the first freewheel mechanism, the carrier, the first set of planet gears, and the sun gear.

\* \* \* \* \*